US012570585B2

(12) United States Patent
An et al.

(10) Patent No.: US 12,570,585 B2
(45) Date of Patent: Mar. 10, 2026

(54) METHODS AND COMPOSITIONS FOR USE IN AGRICULTURAL PROCESSES

(71) Applicant: Solugen, Inc., Houston, TX (US)

(72) Inventors: Jun Su An, Houston, TX (US);
Frederyk Ngantung, Los Angeles, CA (US); Abdul Siraj, Sugar Land, TX (US); Jason Helander, Richmond, TX (US); Paul Schuber, Sugar Land, TX (US); Catherine Gonzalez, Houston, TX (US); Chris Arceo, Richmond, TX (US); Vatren Jurin, Overland Park, KS (US); LoongYi Tan, Houston, TX (US)

(73) Assignee: SOLUGEN, INC., Houston, TX (US)

( * ) Notice: Subject to any disclaimer, the term of this patent is extended or adjusted under 35 U.S.C. 154(b) by 586 days.

(21) Appl. No.: 18/017,846

(22) PCT Filed: Jul. 29, 2021

(86) PCT No.: PCT/US2021/043764
§ 371 (c)(1),
(2) Date: Jan. 24, 2023

(87) PCT Pub. No.: WO2022/026752
PCT Pub. Date: Feb. 3, 2022

(65) Prior Publication Data
US 2023/0271892 A1 Aug. 31, 2023

Related U.S. Application Data

(60) Provisional application No. 63/057,951, filed on Jul. 29, 2020.

(51) Int. Cl.
*C05D 9/02* (2006.01)
*A01G 24/12* (2018.01)

(52) U.S. Cl.
CPC .............. *C05D 9/02* (2013.01); *A01G 24/12* (2018.02)

(58) Field of Classification Search
CPC ................................. C05D 9/02; A01G 24/12
See application file for complete search history.

(56) References Cited

U.S. PATENT DOCUMENTS 3,679,659 A 7/1972 Zak
5,958,867 A 9/1999 Lamberti et al.
(Continued)

FOREIGN PATENT DOCUMENTS

AU 2016231490 A1 * 4/2017 ............... C05G 3/60
CA 2730388 A1 * 1/2010 ............. A01N 59/02
(Continued)

OTHER PUBLICATIONS

OECD Guideline for Testing of Chemicals, Ready Biodegradability, Jul. 17, 1992 (62 p.).
(Continued)

*Primary Examiner* — Wayne A Langel
(74) *Attorney, Agent, or Firm* — CONLEY ROSE, P.C.

(57) ABSTRACT

A micronutrient formulation includes (i) a biochelant; (ii) a micronutrient salt; (iii) a ring opener; and (iv) a solvent. A micronutrient formulation includes a sugar oxidation product, a ring opener, a micronutrient salt and a solvent. The micronutrient formulation has a sodium ion concentration of from about 1,000 ppm to about 99,000 ppm.

16 Claims, 3 Drawing Sheets

| | Zns-B-9 (Solugen) | Zn-Glucoheptonate | Zn-EDTA | Zn-Gluconic Acid |
|---|---|---|---|---|
| □% Zn | 9 | 7 | 9 | 6.5 |

(56)                References Cited

U.S. PATENT DOCUMENTS

| | | | | |
|---|---|---|---|---|
| 6,391,079 | B1 * | 5/2002 | Takeda ..................... | C05D 9/02 |
| | | | | 71/61 |
| 10,035,736 | B2 * | 7/2018 | Goodwin ................. | C05G 3/60 |
| 10,464,856 | B2 * | 11/2019 | Brown .................... | C05D 9/02 |
| 2006/0142158 | A1 * | 6/2006 | Nonomura .............. | A01H 3/04 |
| | | | | 504/101 |
| 2012/0157317 | A1 | 6/2012 | Tanaka et al. | |
| 2020/0060274 | A1 | 2/2020 | Nonomura | |

FOREIGN PATENT DOCUMENTS

| | | | | | |
|---|---|---|---|---|---|
| CA | 3104970 | A1 * | 1/2020 | ............. | A01N 25/14 |
| CN | 106431703 | A | 2/2017 | | |
| CN | 108184374 | A | 6/2018 | | |
| CN | 108558510 | A | 9/2018 | | |
| CN | 108658665 | A | 10/2018 | | |
| CN | 108794155 | A | 11/2018 | | |
| CN | 109369293 | A | 2/2019 | | |
| KR | 101119712 | B1 | 3/2012 | | |
| WO | 2010/027275 | A1 | 3/2010 | | |

OTHER PUBLICATIONS

Brandt Smart Quatro Plus, Bradnt Smart System Technology, Foliar Liquid Nutrient, May 2021 (1 p.).
Seetz, Jan, "Chelates and the Basics of Cleaning," AkzoNobel, SEPAWA Nordic, May 16, 2017, Malmo (42 p.).
D-Gluconic Acid, Biodegration in Water: Screening Tests, European Chemical Agency (2 p.).
Armstrong, Robert D. et al., "How to Synthesise High Purity, Crystalline D-Glucaric Acid Selectively," European Journal of Organic Chemistry, 2017, pp. 6811-6814 (4 p.).
Soil Types and Related Map Samples Contained Within BONAP's Floristic Synthesis, Apr. 15, 2011 (6 p.).
Dossier for Candidate Low-Priority Substance D-Gluco-Heptonic Acid, Sodium Salt (1:1), (2.xi.)—(CASRN 31138-65-5) (Sodium Glucoheptonate), Aug. 9, 2019, Office of Pollution Prevention and Toxics, U.S. Environmental Protection Agency (89 p.).
Dossier for Candidate Low-Priority Substance D-Gluconic Acid, Calcium Salt (2:1) (CASRN 299-28-5) (Calcium Gluconate), Aug. 9, 2019, Office of Pollution Prevention and Toxics, U.S. Environmental Protection Agency (112 p.).
Dossier for Candidate Low-Priority Substance D-Gluconic Acid, Potassium Salt (1:1) (CASRN 299-27-4) (Potassium Gluconate) Aug. 9, 2019, Office of Pollution Prevention and Toxics, U.S. Environmental Protection Agency(107 p.).
Dossier for Candidate Low-Priority Substance D-Gluconic Acid, Sodium Salt (1:1) (CASRN 527-07-1) (Sodium Gluconate), Aug. 9, 2019, Office of Pollution Prevention and Toxics, U.S. Environmental Protection Agency (139 p.).
Dossier for Candidate Low-Priority Substance D-Gluconic Acid (CASRN 526-95-4), Aug. 9, 2019, Office of Pollution Prevention and Toxics, U.S. Environmental Protection Agency (123 p.).
Jurin, Vatren, "Chelates: What They are and How/Where They Fit," Brandt Professional Agriculture, 2016 (https://fluidfertilizer.org/wp-content/uploads/2016/09/Vatren-Jurin.pdf) (19 p.).
European Search Report dated Aug. 8, 2024, for European Application No. 21849027.4 (8 p.).
PCT/US2021/043764 International Search Report and Written Opinion dated Nov. 18, 2021 (13 p.).
Lakhanisky, T., "SIDS Initial Assessment Report for SIAM 18," OECD SIDS, Gluconic Acid and Derivatives, UNEP Publications, Paris, France, Apr. 20-23, 2004 (13 p.).

* cited by examiner

D-glucaro 1,4: 3,6 - dilactone

D-glucaro 1,4- lactone

D-glucaro 6,3- lactone

D-Glucaric Acid

METHODS AND COMPOSITIONS FOR USE IN AGRICULTURAL PROCESSES

CROSS-REFERENCE TO RELATED APPLICATIONS

This application is a 35 U.S.C. § 371 national stage application of PCT/US2021/043764 filed Jul. 29, 2021 and entitled "Methods and Compositions for Use in Agricultural Processes" which claims benefit of U.S. provisional patent application Ser. No. 63/057,951 filed Jul. 29, 2020, and entitled "Methods and Compositions for use in Agricultural Processes," each of which is hereby incorporated herein by reference in its entirety for all purposes.

STATEMENT REGARDING FEDERALLY SPONSORED RESEARCH OR DEVELOPMENT

Not applicable.

TECHNICAL FIELD

The present disclosure relates generally to compositions and methods for use in agricultural processes. More specifically, the present disclosure relates to compositions and methods for the production of chelated nutrients.

BACKGROUND

Agriculture is a multi-billion-dollar industry. To improve plant growth good fertile soils are required and, in the absence of suitably fertile soil, fertilizers are often used to facilitate the growth of agricultural crops. Plants require 18 essential nutrients to grow and survive, classified by their importance into macronutrients (C, H, O, N, P, K, Ca, Mg, S) and micronutrients (B, Cu, Fe, Mn, Zn, Mo, Cl, Co, Ni). Nutrient demands change throughout the life of the plant, and in general increase during vegetative growth but decrease during reproductive development.

Plant growth and development largely depend on the combination and concentration of mineral nutrients available in the soil. Plants often face significant challenges in obtaining an adequate supply of these nutrients to meet the demands of basic cellular processes due to their relative immobility. A deficiency of any one nutrient may result in decreased plant productivity and/or fertility. Symptoms of nutrient deficiency may include stunted growth, death of plant tissue, or yellowing of the leaves caused by a reduced production of chlorophyll. Nutrient deficiency can have a significant impact on agriculture, resulting in reduced crop yield or reduced plant quality. Nutrient deficiency can also lead to reduced overall biodiversity since plants serve as the producers that support most food webs.

SUMMARY

Disclosed herein is a micronutrient formulation comprising (i) a biochelant; (ii) a micronutrient salt; (iii) a ring opener; and (iv) a solvent.

Also disclosed herein is a micronutrient formulation comprising a sugar oxidation product, a ring opener, a micronutrient salt, and a solvent and having a sodium ion concentration of from about 1,000 ppm to about 99,000 ppm.

BRIEF DESCRIPTION OF DRAWINGS

For a detailed description of the aspects of the disclosed processes and systems, reference will now be made to the accompanying drawings in which:

FIG. 1 is a schematic depiction of the equilibrium between glucaric acid and D-glucaro 1,4:3,6-dilactone.

DETAILED DESCRIPTION

Figure 2:
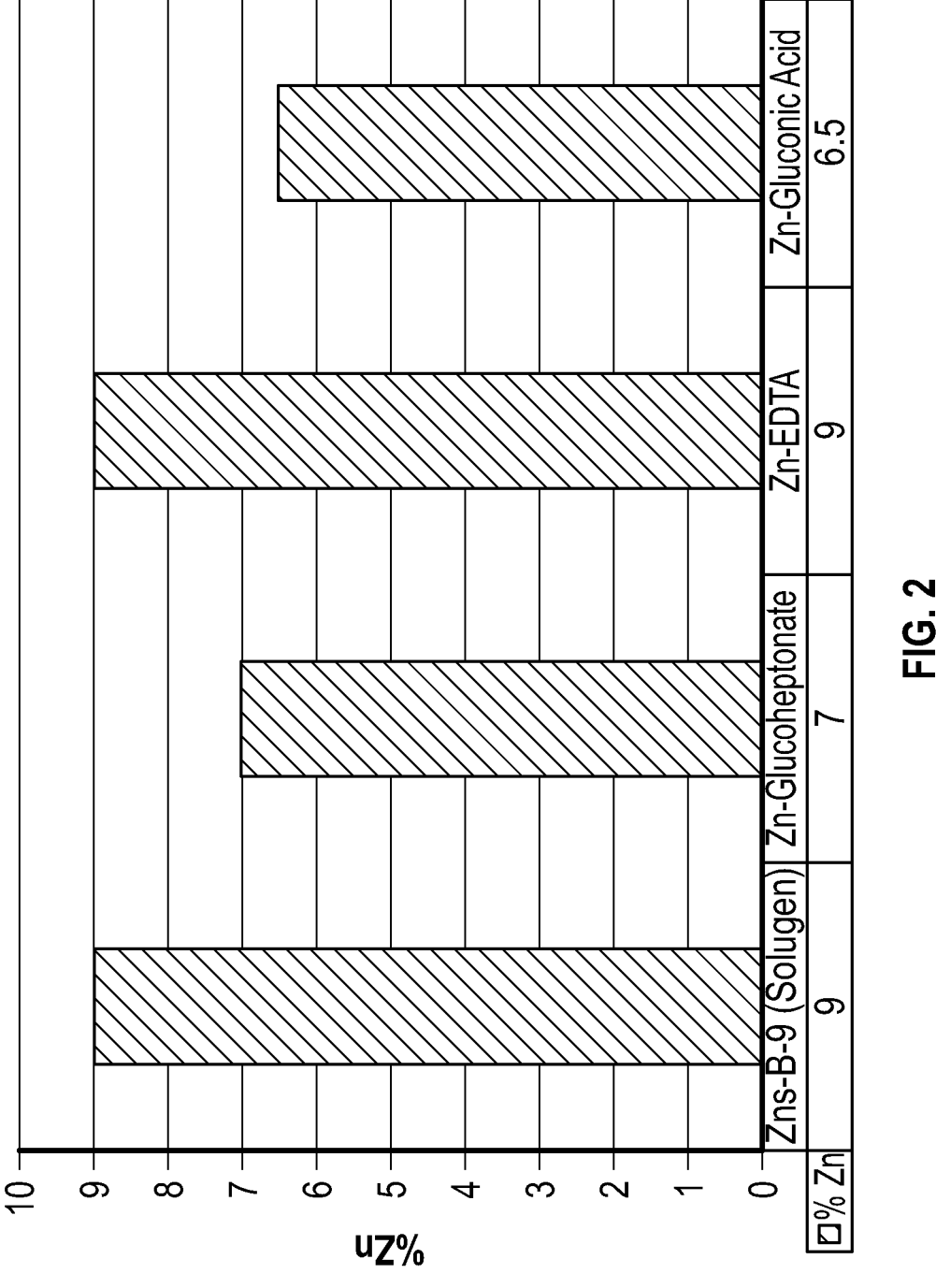
FIG. 2 is bar graph depicting zinc coordination as a function of sample components for the samples from Example 2.

As described above, the deficiency of any one nutrient may result in decreased plant productivity and/or fertility. One way of delivering metal micronutrients to a plant in need thereof is to form a chelated complex of the metal ion with a synthetic chelate. Such a complex maintains the metal ion in a soluble form for ease of application, reduces metal adsorption and fixation in soil, and increases solubility of the metal ion so that it can be effectively delivered in a variety of different methods.

Chelated micronutrients can improve the solubility of the cations as they bind with the cations and keep them in solution. However, there are unique challenges associated with using a chelated micronutrient. Some of the chelates are not biodegradable, and have stability issues at higher pH environments. Additionally, any aqueous metal species will have a concentration of hydroxide in solution, resulting in the cation (i.e., metal) inevitably binding and forming hydroxide species. Further, the solubility for many cations decreases as the pH increases.

Thus, conventional compositions for providing chelated micronutrients, in addition to having little to no biodegradability and reduced efficacy at higher pH, typically contain an undesirably high sodium content and lack of stability in presence of calcium (e.g. calcite and alkaline or "hard water"). Accordingly, an ongoing need exists for novel compounds that effectively chelate micronutrients and exhibit increased biodegradability, lower sodium content, and increased stability in the presence of calcium.

Disclosed herein is a micronutrient formulation comprising a biochelant, a micronutrient salt, a ring opener, and a solvent.

In an aspect, the micronutrient formulation comprises a chelant. Herein, a chelant, also termed a sequestrant or a chelating agent, refers to a molecule capable of bonding a metal. The chelating agent is a ligand that contains two or more electron-donor groups so that more than one bond is formed between a metal ion and the ligand. In an aspect, the chelant is a biochelant. As used herein, the prefix "bio" indicates that the chemical is produced by a biological process such as through reactions involving enzymes.

The biochelant may comprise a sugar oxidation product. For example, the biochelant may comprise disaccharides, oxidized disaccharides, uronic acid, aldaric acid, or a combination thereof. In another aspect, the biochelant comprises (i) aldonic acid, uronic acid, aldaric acid, or a combination thereof; and (ii) a cation. The cation may comprise an alkali metal (Group I), an alkali earth metal (Group II), or combinations thereof. In certain aspects, the cation is sodium, potassium, or calcium.

In an aspect, the biochelant comprises a glucose oxidation product, a gluconic acid oxidation product, or a combination thereof. The glucose oxidation product, gluconic acid oxidation product, or a combination thereof may be buffered to a pH in the range of from about 1 to about 5, alternatively from about 6 to about 10, alternatively from about 2.6 to about 3.6, or in solutions higher than pH 10 depending on the base that is used.

Alternatively, the biochelant comprises a buffered glucose oxidation product, a buffered gluconic acid oxidation product, or a combination thereof. In such aspects, the buffered glucose oxidation product, the buffered gluconic acid oxidation product, or combinations thereof are buffered to a pH within a range disclosed herein with any suitable acid or base (e.g., HCl, NaOH). In such aspects, the biochelant comprises a mixture of gluconic acid and glucaric acid having a minor component species comprising n-keto-acids, $C_2$-$C_6$ diacids, or a combination thereof. In an aspect, the n-keto-acids, $C_2$-$C_6$ diacids, or combination thereof may be present in the biochelant in amounts of less than about 50 wt,% based on the total weight of the biochelant. In an aspect, the biochelant comprises BIOCHELATE™ metal chelation product commercially available from Solugen, Inc. of Houston, Texas. In an aspect, the chelant is present in a composition of the present disclosure in an amount of from about 0.1 weight percent (wt. %) to about 40 wt. % based on the total weight of the composition, alternatively from about 0.1 wt. % to about 20 wt. % or alternatively from about 20 wt. % to about 40 wt. %.

In an aspect, the macronutrient and micronutrient formulation comprises a micronutrient salt. For example, the macronutrient and micronutrient salt may comprise boron, iron, cobalt, copper, magnesium, manganese, zinc, potassium, aluminum, urea, calcium, molybdenum, or a combination thereof; and an anion such as sulfates, sulfites, oxides, chlorides, nitrates, nitrites, phosphates, phosphorous, phosphonates, or a combination thereof. In some aspects, the macronutrient and micronutrient salt comprise oxides of iron, magnesium, manganese, copper, zinc, calcium, potassium, or a combination thereof.

In an aspect, the micronutrient salt comprises humic acids, fulvic acids, salts thereof, or a combination thereof. Herein, humic and fulvic acids refer to the final break-down constituents of the natural decay of plant and animal materials. Humic matter is formed through the chemical and biological humification of plant and animal matter, and through the biological activities of micro-organisms. Humic acids are complex molecules that exist naturally in soils, peats, oceans, and fresh waters. The micronutrient salt may be present in the micronutrient formulation in an amount of from about 0.25 wt. % to about 12 wt. %, alternatively from about 0.25 wt. % to about 2 wt. %, alternatively from about 4 wt. % to about 12 wt. %, or alternatively from about 0.5 wt. % to about 5 wt. % based on the total weight of the micronutrient metal.

Figure 1:
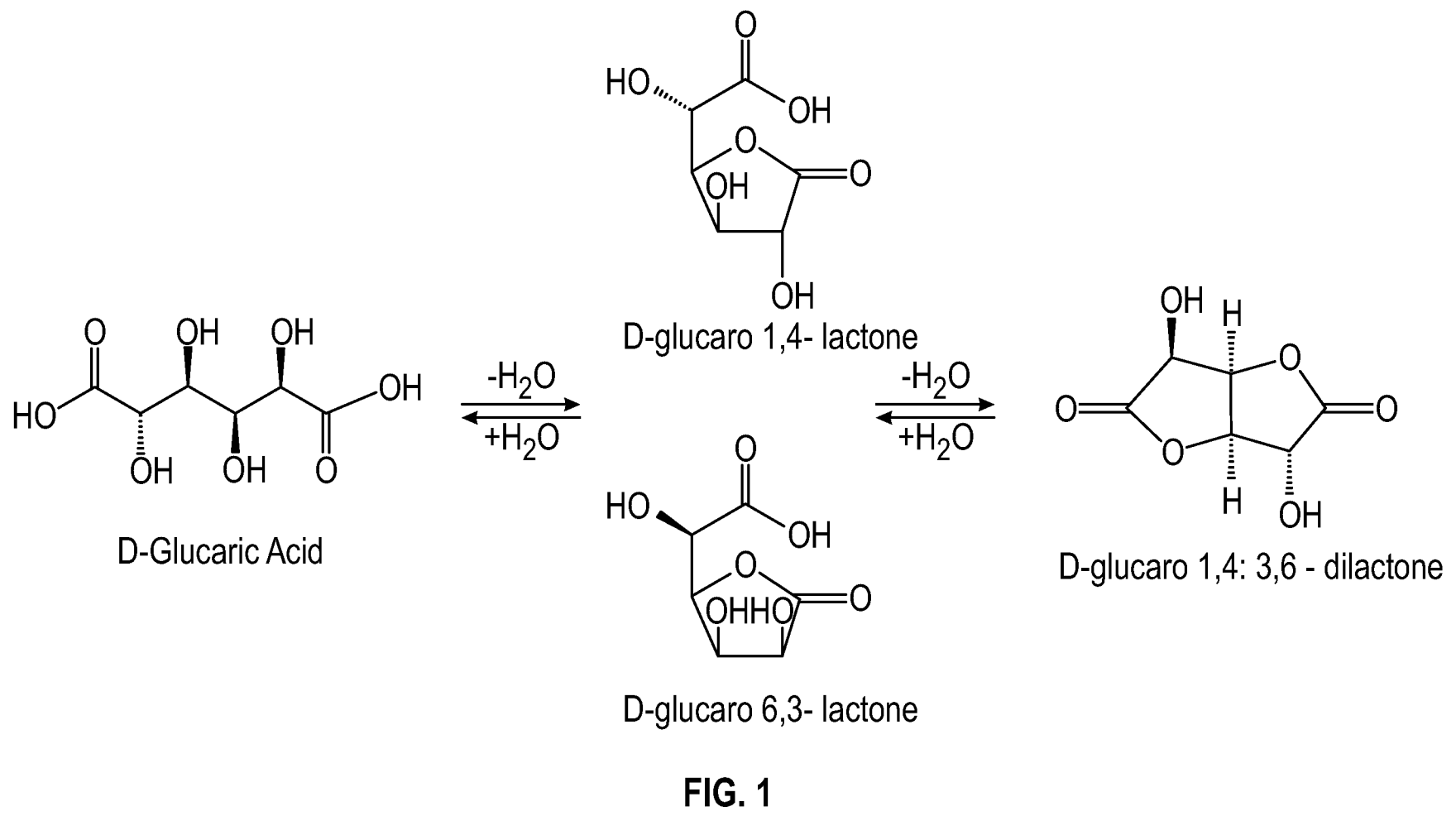

In an aspect, the micronutrient formulation comprises a ring-opener. In an aspect, the ring opener functions to stabilize the acid form of the biochelant, which is in constant equilibrium with the lactone form of the molecule. The acid form is the most effective in chelating cations. In an aspect, the micronutrient formulation comprises a compound that functions to shift the equilibrium to favor retention of the linear glucaric acid and ensure the amount of the lactone form is minimized. This is depicted schematically in FIG. 1.

In an aspect, the ring opener comprises an oxoacid salt, an amide, or a combination thereof. For example, the ring opener may comprise silicic acid, sodium silicate, potassium silicate, monosilicate, silanes, siloxanes, urea, boric acid, aluminates, titanates, urea, acetamide, ethanamide, derivatives thereof, or a combination thereof. In an aspect, the ring opener comprises boric acid, aluminate, urea, silicic acid or a combination thereof. The ring-opener may be present in the micronutrient formulation in an amount ranging from about 2 wt. % to about 95 wt. %, alternatively from about 5 wt. % to about 95 wt. %, alternatively from about 2 wt. % to about 80 wt. %, alternatively from about 10 weight percent (wt. %) to about 40 wt. %, alternatively from about 2 wt. % to about 30 wt. % or alternatively from about 30 wt. % to about 80 wt. % based on to total weight of the micronutrient formulation.

In an aspect, the micronutrient formulation comprises a conventional chelant. For example, the micronutrient formulation may comprise ethylenediaminetetraacetic acid (EDTA), diethylenetriaminepentaacetic acid (DTPA), glutamic acid di-acetate (GLDA), methylglycinediacetic acid (MGDA), ethylenediamine-N,N'-disuccinic acid (EDDS), hydroxyiminodisuccinic acid (HIDS), hydroxyethylethylenediaminetriacetic acid (HEDTA), pentasodium diethylenetriaminepentaacetate (Na5DPTA, DPTA), pentapotassium diethylenetriaminepentaacetate (K5DPTA, DPTA), diethylenetriaminepentaacetic acid (H5DPTA, DPTA), N,N-diacetic acid, tetrasodium (GLDA Na4), glutamic acid, β-alanine diacetic acid (β-ADA), polyamino disuccinic acids, N-bis[2-(1,2-dicarboxyethoxy)ethyl]glycine (BCA6), N-bis [2-(1,2-dicarboxyethoxy)ethyl]aspartic acid (BCA5), N-bis [2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methyl-carboxymethoxy)ethyl]glycine (MCBA3), N-methyliminodiacetic acid (MIDA), iminodiacetic acid (IDA), N-(2-acetamido)iminodiacetic acid (ADA), hydroxymethyliminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid, hydroxyethyliminodiacetate (HEIDA), iminodiacetic acid (IDA), nitrilotriacetic acid (NTA), one or more salts thereof, or a combination thereof. In an aspect, the conventional chelant is present in the micronutrient formulation in an amount ranging from about 5 wt. % to about 50 wt. %, alternatively from about 20 wt. % to about 50 wt. %, or alternatively from about 10 wt. % to about 40 wt. %, based on the total weight of the micronutrient formulation.

In an aspect, the micronutrient formulation comprises a solvent. Solvents suitable for use in the micronutrient formulations disclosed herein include without limitation water, methanol, ethanol, ethylene glycol, propylene glycol, ethylene glycol monobutyl ether, a hydroxide-based pH fluid (KOH, NaOH, etc. . . . ), an ammonia solution, a urea solution, or a combination thereof. In an aspect, the solvent is present in an amount sufficient to meet some user and/or process need (e.g., flow properties). In an aspect, the solvent is present in an effective amount; alternatively, the solvent comprises the remainder of the micronutrient formulation when all other components of the micronutrient formulation are accounted for.

In an aspect, the biochelant component of the micronutrient formulation is biodegradable. The term "biodegradable" refers to a material which can be chemically decomposed (broken down to simpler components) by natural biological processes (e.g. soil bacteria, weather, plants, animals). In an aspect, the biochelant component of the micronutrient formulation of the present disclosure is biodegradable based on the OECD 301B test method.

In an aspect, the micronutrient formulations of the present disclosure are pH stable and effective over the pH range of from about 1 to about 12, alternatively from about 6 to about 9, alternatively from about 1 to about 3, or alternatively from about 8 to about 12.

In an aspect, the micronutrient formulations of the present disclosure are characterized by a sodium ion concentration of from about 1,000 ppm to about 99,000 ppm, alternatively less than about 100,000 ppm, alternatively less than about 10,000 ppm, or alternatively less than about 5,000 ppm based on analysis using Inductively Coupled Plasma-Optimal Emission Spectrometry (ICP-OES). In an aspect, the micronutrient formulation has an ammonia content ranging from about 0.5 wt. % to about 30 wt. %, depending on final formulation pH.

In an aspect, the micronutrient formulation is blended with one or more additional components to provide a material suitable for application to a plant. Hereinafter, this is referred to as a "treatment composition." In such aspects, the treatment composition comprises the micronutrient formulation and at least one compound selected from the group consisting of nitrates, nitrites, phosphates, sulfates, insecticides, herbicides, fungicides, macronutrients, plant hormones, dry fertilizer, liquid fertilizers, adjuvants, bio-stimulants, surfactants, oxidizers, biologicals, water treatment/irrigation products, and plant hormones. For example, the micronutrient formulation may be combined with a preplant fertilizer, macronutrients, and plant hormones. In another example, the biochelant product is fully compatible with conventional herbicides such as glyphosate, and provides higher stability with orthophosphate nutrients than conventional carboxylic acids such as citric acid.

In an alternative aspect, the micronutrient formulation is used as a building block additive. In such an aspect, the micronutrient formulation is used to formulate and manufacture additional micronutrients.

In an aspect, a micronutrient formulation of the present disclosure is prepared as a treatment composition, in either liquid or solid form. The present disclosure contemplates contacting of the treatment composition with a plant using any suitable methodology such as and without limitation foliar, soil, fertigation, chemigation, irrigation, hydroponics, aeroponic, indoor vertical farming, and other applications. In an aspect, the treatment composition is applied to the ground surrounding a plant or to the foliage of the plant using any suitable methodology to deliver readily absorbable trace metals to the plant tissue. For example, the treatment composition may be contacted with plants by introduction to an irrigation system for application by drip irrigation.

Other nonlimiting examples of methods for contacting the treatment composition with a plant include the direct spray of a diluted aqueous solution of the treatement compositon on the leaves, stems, and fruits of a plant; injection of the treatment composition into the soil; injection of the treatment composition into the water culture, circulation of the treatment composition past an absorbent such as rock wool that is held in direct contact with the roots of a plant; continuous addition of the treatment composition to the feed water of a plant; or a combination thereof.

In aspects in which the treatment composition is a liquid, it may be sprayed or poured onto the base growing medium or it may be sprayed onto an above ground portion of the plant. In aspects in which the treatment composition is a solid, it may be spread onto the surface of the base growing medium or it may be mixed into the base growing medium. Herein, base growing medium refers to a standard material that is commonly used to grow plants, for example soil or compost. Alternatively, the treatment composition may be contacted with a part of a plant that is above the ground, for example the leaves, flowers, fruit, or stem.

The micronutrient formulations of the present disclosure can be used effectively in nanomolar concentrations. Consequently, the treatment compositions may be applied to virtually any variety of plant shoots, roots, seeds, tissues, suspension cultures, or thalli. The micronutrient formulation can be applied to all photosynthetic organisms such as flowering plants, including angiosperms and gymnosperms, and cryptograms, including ferns, liverworts, mosses, algae and hornworts. In particular, the micronutrient formulation may be advantageously applied to higher plants, including species having true stems, roots, and leaves.

Examples of plants that may benefit from the micronutrient formulations of the present disclosure include all crop plants such as alfalfa, anise, bach ciao, barley, basil, blueberry, breadfruit, broccoli, brussels sprouts, cabbage, cassava, cauliflower, celery, cereals, cilantro, coffee, corn, cotton, cranberry, cucumber, dill, eggplant, fennel, grape, grain, garlic, kale, leek, legume, lettuce, melon, mint, mustard, melon, oat, onion, parsley, peanut, pepper, potato, saffron, legume, lettuce, millet, parsnip, pea, pepper, peppermint, pumpkin, radish, rice, sesame, sorghum, soy, spinach, squash, stevia, strawberry, sunflower, sweet potato, sugar beet, sugar cane, tea, tobacco, tomato, turnip, wheat, yam, zucchini and the like; pomes and other fruit-bearing plants such as apple, avocado, banana, breadfruit, cherry, citrus, cocoa, fig, guava, macadamia, mango, mangosteen, nut, olive, papaya, passion fruit, pear, pepper, plum, peach and the like; floral plants such as achillea, ageratum, alyssum, anemone, aquilegia, aster, azalea, begonia, bird-of-paradise, bleeding heart, borage, bromeliad, bougainvillea, buddlea, cactus, calendula, camellia, campanula, carex, carnation, celosia, chrysanthemum, clematis, cleome, coleus, cosmos, crocus, croton, cyclamen, dahlia, daffodil, daisy, day lily, delphinium, dianthus, digitalis, dusty miller, euonymus, forget-me-not, fremontia, fuchsia, gardenia, gazania, geranium, gerbera, gesneriad, ginkgo, gladiolus, hibiscus, hydrangea, impatiens, jasmine, lily, lilac, lisianthus, lobelia, marigold, mesembryanthemum, mimulus, myosotis, New Guinea Impatiens, nymphaea, oenothera, oleander, orchid, oxalis, pansy, penstemon, peony, petunia, poinsettia, polemonium, polygonum, poppy, portulaca, primula, ranunculus, rhododendron, rose, salvia, senecio, shooting star, snapdragon, solanum, solidago, stock, ti, torenia, tulip, verbena, vinca, viola, violet, zinnia, and the like; leafy plants such as ficus, fern, hosta, philodendron, and the like, trees such as Abies, birch, cedar, Cornus, cypress, elm, fir, juniper, magnolia, mahogany, maple, oak, palm, Picea, Pinus, Pittossporum, Plantago, poplar, redwood, Salix, sycamore, Taxus, teak, willow, yew, Christmas tree and the like; grasses, such as Kentucky blue grass, bent grass, turf, festuca, pennisetum, phalaris, calamogrostis, elymus, helictotrichon, imperata, molina, carex, miscanthus, panicum, and the like; and thalloid plants such as ferns and algae. Algae include seaweeds such as kelp, Eucheuma, laver, nori, kombu, and wakame. Other plants that may benefit from application of the micronutrient formulation of the present disclosure will be apparent to those skilled in the art.

In an aspect, utilization of micronutrient formulations of the type disclosed herein result in enhanced plant productivity as demonstrated by increased growth rate, increased biomass, higher yields and quality (protein content), accelerated rate of root formation, increased tillering, increased chlorophyll concentration, and the like indicia.

ADDITIONAL DISCLOSURE

The following are non-limiting, specific aspects in accordance with the present disclosure:

A first aspect which is a micronutrient formulation comprising (i) a biochelant; (ii) a micronutrient salt; (iii) a ring opener; and (iv) a solvent.

A second aspect which is the micronutrient formulation of the first aspect, wherein the biochelant comprises a sugar oxidation product, a disaccharide, an oxidized disaccharide, uronic acid, aldaric acid or a combination thereof.

A third aspect which is the micronutrient formulation of any of the first through second aspects, wherein the biochelant comprises aldonic acid, uronic acid, aldaric acid, a salt thereof, a derivative thereof, or a combination thereof A fourth aspect which is the micronutrient formulation of any of the first through third aspects, wherein the biochelant comprises sodium gluconate, oxidation products of sodium glucarate, one or more salts thereof, one or more derivatives thereof, or a combination thereof.

A fifth aspect which is the micronutrient formulation of the fourth aspect, wherein the biochelant further comprises n-keto acids and $C_2$-$C_6$ diacids in amounts of less than about 50 wt. %.

A sixth aspect which is the micronutrient formulation of any of the first through fifth aspects, wherein the biochelant is present in an amount of from about 0.1 wt. % to about 40 wt. % based on the total weight of the micronutrient formulation.

A seventh aspect which is the micronutrient formulation of any of the first through sixth aspects, wherein the micronutrient salt comprises boron, iron, cobalt, copper, magnesium, manganese, zinc, potassium, aluminum, urea, calcium, molybdenum or a combination thereof.

An eighth aspect which is the micronutrient formulation of any of the first through seventh aspects, wherein the micronutrient salt comprises sulfates, sulfites, oxides, chlorides, nitrates, nitrites, phosphates, molybdate, phosphorous, phosphonates or a combination thereof.

A ninth aspect which is the micronutrient formulation of any of the first through eighth aspects, wherein the micronutrient salt comprises an oxide of iron, magnesium, manganese, copper, zinc, calcium, potassium or a combination thereof.

A tenth aspect which is the micronutrient formulation of any of the first through ninth aspects, wherein the micronutrient salt comprises humic acids, fulvic acids, salts thereof or a combination thereof.

An eleventh aspect which is the micronutrient formulation of any of the first through tenth aspects, wherein the micronutrient salt is present in an amount of from about 0.25 wt. % to about 12 wt. % based on the weight of the micronutrient formulation.

A twelfth aspect which is the micronutrient formulation of any of the first through eleventh aspects, wherein the ring opener comprises silicic acid, sodium silicate, potassium silicate, monosilicate, silanes, siloxanes, urea, boric acid, aluminates, titanates, urea, acetamide, ethanamide, derivatives thereof, or a combination thereof.

A thirteenth aspect which is the micronutrient formulation of any of the first through twelfth aspects, wherein the ring opener is present in the micronutrient formulation in an amount of from about 2 wt. % to about 95 wt. % based on the total weight of the micronutrient formulation.

A fourteenth aspect which is the micronutrient formulation of any of the first through thirteenth aspects, wherein the solvent comprises water, methanol, ethanol, ethylene glycol, propylene glycol, ethylene glycol monobutyl ether, a hydroxide-based pH fluid, an ammonia solution, a urea solution or a combination thereof A fifteenth aspect which is the micronutrient formulation of any of the first through fourteenth aspects, further comprising ethylenediaminetetraacetic acid (EDTA), diethylenetriaminepentaacetic acid (DTPA), glutamic acid di-acetate (GLDA), methylglycinediacetic acid (MGDA), ethylenediamine-N,N'-disuccinic acid (EDDS), hydroxyiminodisuccinic acid (HIDS), hydroxyethylethylenediaminetriacetic acid (HEDTA), pentasodium diethylenetriaminepentaacetate (Na5DPTA, DPTA), pentapotassium diethylenetriaminepentaacetate (K5DPTA, DPTA), diethylenetriaminepentaacetic acid (H5DPTA, DPTA), N,N-diacetic acid, tetrasodium (GLDA Na4), glutamic acid, β-alanine diacetic acid (β-ADA), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethyl-amino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, hydroxyethyliminodiacetate (HEIDA), iminodiacetic acid (IDA), nitrilotriacetic acid (NTA), salts thereof or a combination thereof.

A sixteenth aspect which is the micronutrient formulation of any of the first through fifteenth aspects, wherein the biochelant is deemed biodegradable using conventional OECD 301B parameters, and other equivalent testing methods.

A seventeenth aspect which is a plant treatment formulation comprising the micronutrient formulation of the first aspect and at least one compound selected from the group consisting of nitrates, nitrites, phosphates, sulfates, insecticides, herbicides, fungicides, macronutrients, plant hormones, dry fertilizer, liquid fertilizers, adjuvants, bio-stimulants, surfactants, oxidizers, biologicals, water treatment/irrigation products, plant hormones and a combination thereof.

An eighteenth aspect which is a method of treating a plant comprising applying the plant treatment formulation of the seventeenth aspect to a plant.

A nineteenth aspect which is the method of the eighteenth aspect wherein applying the plant treatment formulation comprises direct spray of the treatment composition onto the plant, injection of the treatment composition into the soil, injection of the treatment composition into the water culture, circulation of the treatment composition past an absorbent Notably, calcium chelation is increased in the presence of both a ring opener (e.g., boric acid) and a biochelant.

Example 2

The ability of micronutrient formulations of the type disclosed herein to release boron and zinc was investigated. Blends of boron, zinc, and glucaric acid were mixed and are presented as samples 7-11 in Table 2.

TABLE 2

| Sample No. | Blend | Final pH | % Zn (mass) | % B(mass) | % Ammonia | % N (mass) | % SO4 (mass) | % S (mass) |
|---|---|---|---|---|---|---|---|---|
| 7 | ZnS-B-6 | 7.900 | 7.14% | 1.74% | 12.50% | 10.27% | 10.8% | 3.6% |
| 8 | ZnS-B-8 | 9.130 | 6.53% | 2.13% | 10.48% | 8.62% | 9.9% | 3.3% |
| 9 | ZnS-B-CG-1 | 7.050 | 7.09% | 0.00% | 7.19% | 5.91% | 10.7% | 3.6% |
| 10 | ZnS-B-9 | 7.950 | 9.02% | 0.19% | 13.13% | 10.80% | 13.6% | 4.5% |
| 11 | ZnS-B-10 | 8.750 | 8.73% | 0.37% | 13.34% | 10.97% | 13.2% | 4.4% | which is held in direct contact with the roots of a plant, continuous addition of the treatment composition to the feed water or a combination thereof.

A twentieth aspect which is a micronutrient formulation comprising a sugar oxidation product, a ring opener, a micronutrient salt and a solvent and having a sodium ion concentration of from about 1,000 ppm to about 99,000 ppm.

EXAMPLES

The subject matter having been generally described, the following examples are given as particular aspects of the disclosure and are included to demonstrate the practice and advantages thereof. Those of skill in the art should, in light of the present disclosure, appreciate that many changes can be made in the specific aspects which are disclosed and still obtain a like or similar result without departing from the scope of the subject matter of the instant disclosure. It is understood that the examples are given by way of illustration and are not intended to limit the specification of the claims to follow in any manner.

Example 1

The ability of a micronutrient formulation of the type disclosed herein to chelate calcium was investigated. Specifically, a common test method, AATCC 149, was used to evaluate the efficacy of an opened glucaric acid vs. an "un-opened glucaric acid" in chelating calcium. The reagents investigated are listed in Table 1. The amount of calcium chelated per sample is presented in the second column of Table 1.

TABLE 1

| Sample No. | Reagent | CaCV (mg CaCO3/g chelant) | Moles of Ring Opener to Glucaric Acid |
|---|---|---|---|
| 1 | Glucaric acid + aluminate | 402 | 1.2 |
| 2 | Glucaric acid + urea | 488 | 1.2 |
| 3 | Glucaric acid + boric acid | 282 | 1.2 |
| 4 | Glucaric acid + silicic acid | 377 | 1.2 |
| 5 | Glucaric acid | 13 | N/A |
| 6 | Gluconic acid | 6 | N/A |

As seen in Table 2, glucaric acid blends result in boron percentages that are increased when compared to conventional micronutrient formulations having from 0.25% to 0.50% boron. Notably, all of the samples in Table 2 contained glucaric acid. Furthermore, the low-boron blend resulted in % Zn of 9%. Blends 7-11 consist of the following in different ratios: glucaric acid, zinc sulfate, boric acid, and aqua ammonia.

The percentage zinc chelated by a micronutrient formulation of the type disclosed herein, Sample 10 in Table 2, was compared to the amount chelated using conventional chelants. The results are presented in FIG. 2. As shown in FIG. 2, a micronutrient formulation of the type disclosed herein, Sample 10, displayed the same percentage zinc chelation as EDTA and more than glucoheptonate or gluconic acid. Furthermore, Sample 10 still contained boron which is a necessary macronutrient. The samples utilizing EDTA, glucoheptonate or gluconic acid did not contain boron.

Figure 3:
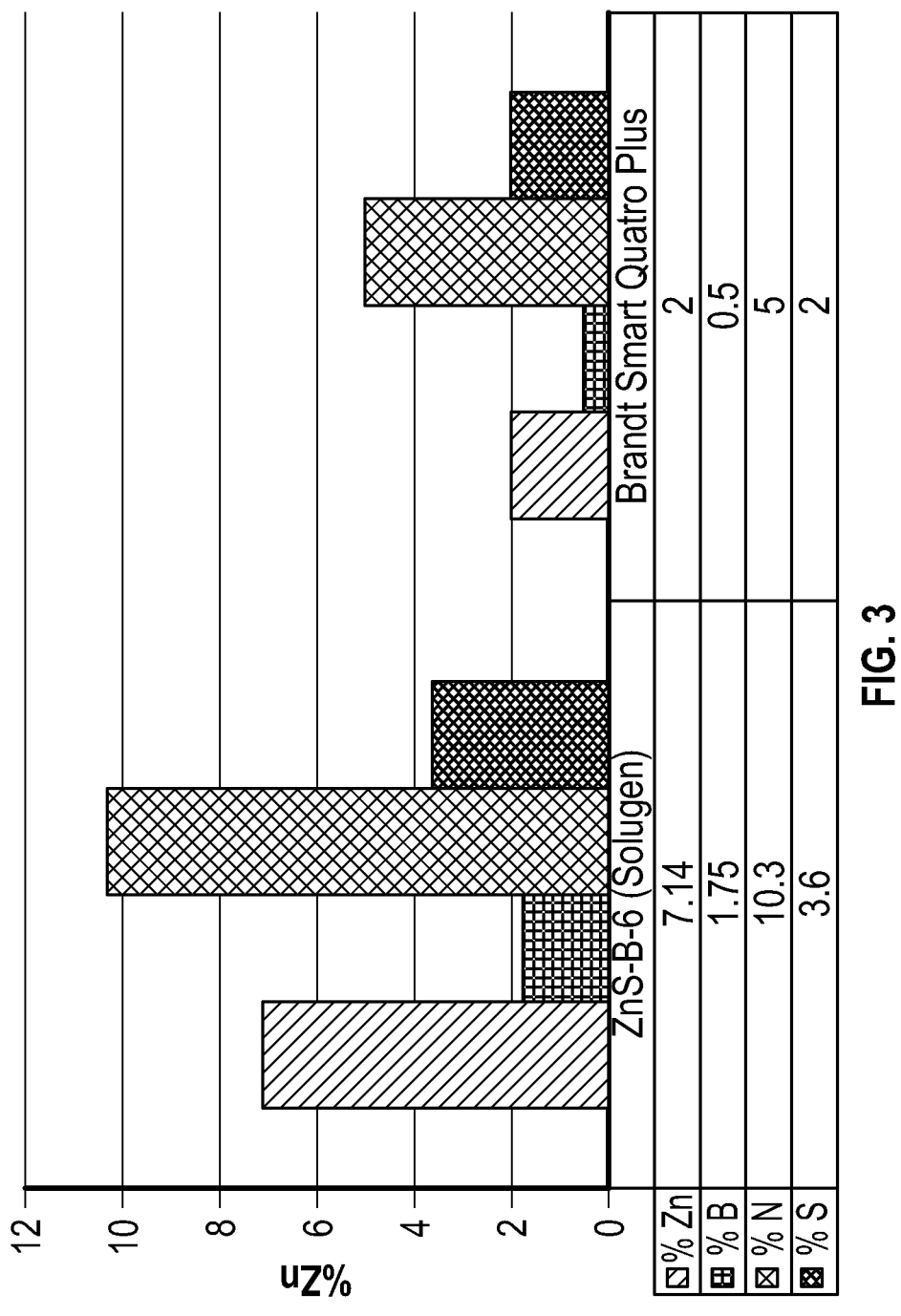
FIG. 3 is a bar graph depicting zinc coordination as a function of sample components for the samples from Example 3.

A similar analysis of Sample 7 from Table 2 was made and compared to a commercial micronutrient formulation, BRANDT SMART QUATRO PLUS. BRANDT SMART QUATRO PLUS is a no phosphate fertilizer specifically formulated for foliar delivery of boron, manganese, molybdenum and zinc commercially available from BRANDT Springfield, Illinois. The results are presented in FIG. 3. Referring to FIG. 3, Sample 7 contained more zinc, boron, nitrogen, and sulfur than the commercial product.

Example 3

The ability of glucaric acid to act as a natural humectant was investigated. Specifically, a blend of zinc glucarate was compared with zinc sulfate by placing a drop of the aforementioned fluids on watch glass, and subjecting the fluids to standard temperature and pressure conditions for 24 hours. The zinc sulfate was observed to completely dry while the zinc glucarate blend remained liquid. This indicated that the zinc glucarate sample can hold water more effectively than incumbent salts (e.g., zinc sulfate), acting as a natural humectant. This allows for the plant to hold water on the leaf surface for a longer amount of time, leading to more efficient leaf absorption.

The extent to which a BIOCHELATE™ product was able to chelate iron was compared to a commercial chelant. The iron ppm levels were analyzed via inductively coupled plasma (ICP). The sodium levels were also analyzed. Table 3 has the properties of the blends as well as the ICP results.

TABLE 3

| Sample No. | Sample Name | FeCl$_2$ dry (g) | FeCl$_3$ dry (g) | 40% FeCl$_3$ Liquid (g) | 50% Gluconic Acid (g) | 20% Aqua Ammonia (g) | Fe 238.204 nm ppm | Na 330.298 nm ppm |
|---|---|---|---|---|---|---|---|---|
| 12 | FeCl$_3$ + GO50 | 0 | 60 | 0 | 240 | 0 | 108509.54 | 4779.94 |
| 13 | FeCl$_2$ + GO50 + NH$_4$ | 60 | 0 | 0 | 190 | 173 | 70619.46 | 2760.17 |
| 14 | FeCl$_3$ (high) + GO50 + NH$_4$ | 0 | 90 | 0 | 60 | 240.46 | 83255.45 | 3446.65 |
| 15 | FeCl$_3$ liq + GO50 | 0 | 0 | 25 | 40 | 0 | 53577.43 | 2170.3 |
| 16 | Dow VERSENOL AG FE Chelate (iron EDTA) | N/A | N/A | N/A | N/A | N/A | 59877.28 | 99659.84 |

GO50 is 50% gluconic acid

As seen in Table 3, the micronutrient formulations of the present disclosure provided increased iron concentration and significantly lower sodium concentrations than the commercial product.

Example 4

To determine the pH stability of the micronutrient formulations of the type disclosed herein a simple experiment was performed. A solution of gluconic acid+iron chloride (FeCl$_3$ liq+GO50, Table 3, Sample 12) and Dow's VERSENOL AG FE Chelate (Iron EDTA) was compared. The samples were placed in a beaker, and approximately 2 mL of 2N NaOH was added to increase the pH to alkaline levels. Both samples exhibited stable, colloid free properties prior to NaOH addition. However, VERSENOL AG FE exhibited colloidal solid formation after NaOH was added, while Sample 12 remained solids free. This indicated that the gluconic acid provides a wider pH stability than EDTA.

While aspects of the disclosure have been shown and described, modifications thereof can be made without departing from the spirit and teachings of the presently disclosed subject matter. The aspects and examples described herein are exemplary only, and are not intended to be limiting. Many variations and modifications of the subject matter disclosed herein are possible and are within the scope of the present disclosure.

At least one aspect is disclosed and variations, combinations, and/or modifications of the aspect(s) and/or features of the aspect(s) made by a person having ordinary skill in the art are within the scope of the disclosure. Alternative aspects that result from combining, integrating, and/or omitting features of the aspect(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, Rl, and an upper limit, Ru, is disclosed, any number falling within the range is specifically disclosed. In particular, the following numbers within the range are specifically disclosed: R=Rl+k*(Ru–Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the detailed description of the presently disclosed subject matter.

What is claimed is:

1. A micronutrient formulation comprising:
   (i) a biochelant comprising sodium gluconate, oxidation products of sodium glucarate, one or more salts thereof, one or more derivatives thereof, or a combination thereof, wherein the biochelant is present in an amount of from about 0.1 wt. % to about 40 wt % based on the total weight of the micronutrient formulation;
   (ii) a micronutrient salt;
   (iii) a ring opener; and
   (iv) a solvent,
   wherein the micronutrient formulation has a sodium ion concentration of from about 1,000 ppm to about 99,000 ppm.

2. The micronutrient formulation of claim 1, wherein the biochelant further comprises n-keto acids and C$_2$-C$_6$ diacids in amounts of less than about 50 wt. %.

3. The micronutrient formulation of claim 1, wherein the micronutrient salt comprises boron, iron, cobalt, copper, magnesium, manganese, zinc, potassium, or a combination thereof.

4. The micronutrient formulation of claim 1, wherein the micronutrient salt comprises a sulfate, a sulfite, an oxide, a chloride, a nitrate, a nitrite, a phosphate, molybdate, phosphorous, a phosphonate, or a combination thereof.

5. The micronutrient formulation of claim 1, wherein the micronutrient salt comprises an oxide of iron, magnesium, manganese, copper, zinc, or a combination thereof.

6. The micronutrient formulation of claim 1, wherein the micronutrient salt comprises a humic acid, a fulvic acid, a salt thereof, or a combination thereof.

7. The micronutrient formulation of claim 1, wherein the micronutrient salt is present in an amount of from about 0.25 wt. % to about 12 wt. % based on the weight of the micronutrient formulation.

8. The micronutrient formulation of claim 1, wherein the ring opener comprises silicic acid, sodium silicate, potassium silicate, monosilicate, silanes, siloxanes, boric acid, aluminates, titanates, urea, acetamide, ethanamide, derivatives thereof, or a combination thereof.

9. The micronutrient formulation of claim 1, wherein the ring opener is present in the micronutrient formulation in an amount of from about 2 wt. % to about 95 wt. % based on the total weight of the micronutrient formulation.

10. The micronutrient formulation of claim 1, wherein the solvent comprises water, methanol, ethanol, ethylene glycol, propylene glycol, ethylene glycol monobutyl ether, a hydroxide-based pH fluid, an ammonia solution, a urea solution, or a combination thereof.

11. The micronutrient formulation of claim 1, further comprising ethylenediaminetetraacetic acid (EDTA), diethylenetriaminepentaacetic acid (DTPA), glutamic acid diacetate (GLDA), methylglycinediacetic acid (MGDA), ethylenediamine-N,N'-disuccinic acid (EDDS), hydroxyiminodisuccinic acid (HIDS), hydroxyethylethylenediaminetriacetic acid (HEDTA), pentasodium diethylenetriaminepentaacetate (Na5DPTA, DPTA), pentapotassium diethylenetriaminepentaacetate (K5DPTA, DPTA), diethylenetriaminepentaacetic acid (H5DPTA, DPTA), N,N-diacetic acid, tetrasodium (GLDA Na4), glutamic acid, β-alanine diacetic acid (β-ADA), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyliminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N"'-disuccinic acid, 1,6-hexamethylenediamine-N,N'-disuccinic acid, tetraethylenepentamine-N,N""-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid, hydroxyethyliminodiacetate (HEIDA), iminodiacetic acid (IDA), nitrilotriacetic acid (NTA), one or more salts thereof, or a combination thereof.

12. The micronutrient formulation of claim 1, wherein the biochelant is deemed biodegradable according to OECD 301B parameters.

13. A plant treatment formulation comprising the micronutrient formulation of claim 1 and at least one compound selected from the group consisting of nitrates, nitrites, phosphates, sulfates, insecticides, herbicides, fungicides, macronutrients, plant hormones, dry fertilizer, liquid fertilizers, adjuvants, bio-stimulants, surfactants, oxidizers, biologicals, water treatment/irrigation products, plant hormones, and a combination thereof.

14. A method of treating a plant comprising applying the plant treatment formulation of claim 13 to a plant.

15. The method of claim 14, wherein applying the plant treatment formulation comprises direct spray of the treatment composition onto the plant, injection of the treatment composition into the soil, injection of the treatment composition into the water culture, circulation of the treatment composition past an absorbent held in direct contact with the roots of a plant, continuous addition of the treatment composition to the feed water, or a combination thereof.

16. A micronutrient formulation comprising:

a biochelant comprising sodium gluconate, oxidation products of sodium glucarate, one or more salts thereof, one or more derivatives thereof, or a combination thereof;

a ring opener;

a micronutrient salt; and a solvent;

wherein the biochelant is present in an amount of from about 0.1 wt % to about 40 wt. % based on the total weight of the micronutrient formulation, and wherein the micronutrient formulation has a sodium ion concentration of from about 1,000 ppm to about 99,000 ppm, wherein the ring opener comprises silicic acid, sodium silicate, potassium silicate, monosilicate, silanes, siloxanes, boric acid, aluminates, titanates, urea, acetamide, ethanamide, derivatives thereof, or a combination thereof, and further wherein the ring opener is present in the micronutrient formulation in an amount of from about 2 wt. % to about 95 wt. % based on the total weight of the micronutrient formulation.

* * * * *